United States Patent
Tozawa et al.

(10) Patent No.: US 7,424,779 B2
(45) Date of Patent: Sep. 16, 2008

(54) CUTTING TOOL

(75) Inventors: Katsumi Tozawa, Anjo (JP); Masamichi Miyazawa, Anjo (JP)

(73) Assignee: Makita Corporation, Anjo (JP)

( * ) Notice: Subject to any disclaimer, the term of this patent is extended or adjusted under 35 U.S.C. 154(b) by 58 days.

(21) Appl. No.: 11/113,073

(22) Filed: Apr. 25, 2005

(65) Prior Publication Data
US 2005/0246905 A1 Nov. 10, 2005

(30) Foreign Application Priority Data
May 10, 2004 (JP) .............................. 2004-140059

(51) Int. Cl.
*B23D 49/16* (2006.01)
(52) U.S. Cl. .............................. 30/392; 30/393; 30/516
(58) Field of Classification Search .................... 30/392, 30/393, 394, 516, 517, 166.3; 83/169; 173/141
See application file for complete search history.

(56) References Cited

U.S. PATENT DOCUMENTS

| | | | | |
|---|---|---|---|---|
| 3,033,252 | A | * | 5/1962 | Atkinson ...................... 30/392 |
| 5,392,519 | A | * | 2/1995 | Inoue et al. .................... 30/393 |
| 6,226,877 | B1 | * | 5/2001 | Ono ............................. 30/392 |
| 6,523,267 | B1 | | 2/2003 | Osada et al. |
| 6,688,005 | B1 | * | 2/2004 | Tachibana et al. ............. 30/392 |

FOREIGN PATENT DOCUMENTS

JP    A 2000-301411    10/2000

* cited by examiner

*Primary Examiner*—Boyer D. Ashley
*Assistant Examiner*—Omar Flores-Sánchez
(74) *Attorney, Agent, or Firm*—Oliff & Berridge, PLC

(57) ABSTRACT

A cutting tool is provided for preventing dust intrusion into a guide member effectively as well as cooling a housing, thereby maintaining an excellent operability. A cutting tool has a body housing including an upper housing and a lower housing. In front of a flange portion of the lower housing, right-and-left air outlets are provided. At the front end of the lower housing, right-and-left second guiding ports are provided. Further, between an insulating cover and the lower housing, clearances which allow the outlets and the second guiding ports to communicate with each other are provided. Therefore, when the insulating cover is placed, an air passage is formed in which cooling air discharged from the air outlets moves to the front passing through the clearances, and flows into a space as the junction through the second guiding ports to be discharged to the front.

12 Claims, 7 Drawing Sheets

CUTTING TOOL

This application claims the benefit of Japanese Patent Application Number 2004-140059 filed May 10, 2004, the entirety of which is incorporated by reference.

BACKGROUND OF THE INVENTION

1. Field of the Invention

The present invention relates to a cutting tool such as a reciprocating saw performing cutting operation with a blade protruding to the front of a housing.

2. Description of the Related Art

A conventional cutting tool such as a reciprocating saw has a metal housing which accommodates a slider for performing reciprocating motion in accordance with rotation of a motor. The cutting tool also has a blade connected to the top of the slider and protruding at the front of the housing. With this configuration, the blade performs the reciprocating motion with the slider simultaneously, thereby enabling cutting of a material to be cut.

On the other hand, the housing on which an insulation cover made of rubber and so on is placed is known in order to provide excellent electrical isolation during cutting performance and provide a user with little discomfort caused by temperature rise in the housing. In particular, Japan Published Unexamined Patent Application No. 2000-301411 discloses a cutting tool in which a resilient member serving as an insulation cover is placed to a front cover in order to improve heat insulation. Further, a clearance is provided between the front cover and a gear cover provided therein and then air for cooling a motor flows into the clearance, whereby the front cover and the gear cover can be cooled. Moreover, a base (a guide member) which holds the blade stable with respect to the material to be cut is attached in order to adjust the length of forward extrusion of the blade.

However, during cutting operation, a cutting portion is hard to be seen because it is covered with dust generated from the material to be cut. As a result, a user has trouble to stop his operation in order to remove the dust very often, thereby deteriorating operability. In particular, the dust intruding into an attaching portion of the guide member obstructs the guide member's smooth movement. As a result, operability concerning adjustment of a guiding position is lowered.

To solve the above problem, the object of the present invention is to provide a cutting tool in which air for cooling a motor is used to cool a housing as well as effectively prevent dust intrusion into an attaching portion of a guide member, thereby maintaining excellent operability.

SUMMARY OF THE INVENTION

In order to achieve the above object, in a first aspect of the present invention, an insulating cover is extended to a rear part of a housing so as to cover an exhaust port of cooling air. Moreover, between the housing and the insulating cover an air passage is provided in which the cooling air discharged from the exhaust port is guided into an attaching portion of a guide member after passing through a clearance between the housing and the insulating cover, and then discharged to the front of the housing.

In a second aspect of the present invention based on the first aspect, a cutting tool further includes a slider penetrating the housing and a sealing member on the penetrating portion. In order to maintain an excellent sealing property, the cutting tool has a second air passage in which the cooling air is guided into the housing through a guiding port provided thereon after passing through the clearance between the housing and the insulating cover, and moves along the surface of the slider in front of the sealing member. Then, the cooling air is discharged to the outside of the housing.

According to the first aspect of the present invention, the housing can be cooled and dust intrusion into the attaching portion of the guide member can be efficiently prevented. Whereby, operability concerning adjustment of the guide member can be kept to be excellent.

According to the second aspect of the present invention, in addition to the effect of the first aspect, dust intrusion into the housing from the sealing portion of the slider can also be prevented. Whereby, the excellent sealing property in the housing can be maintained by using the cooling air efficiently.

DETAILED DESCRIPTION OF THE PREFERRED EMBODIMENT

An embodiment according to the present invention is described below based on the drawings.

Figure 1:
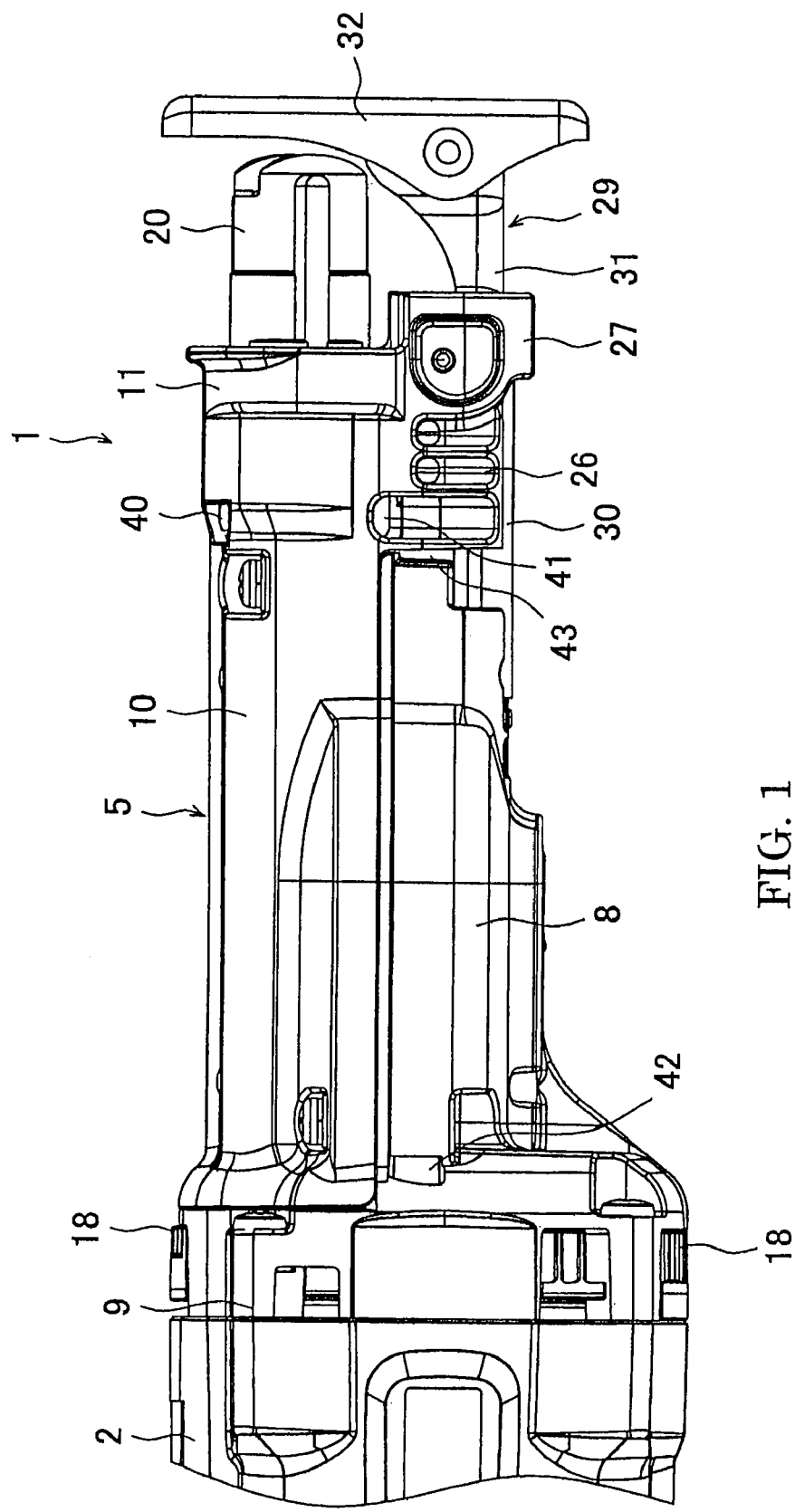
FIG. 1 is a side view of a reciprocating saw (without an insulating cover).
Figure 2:
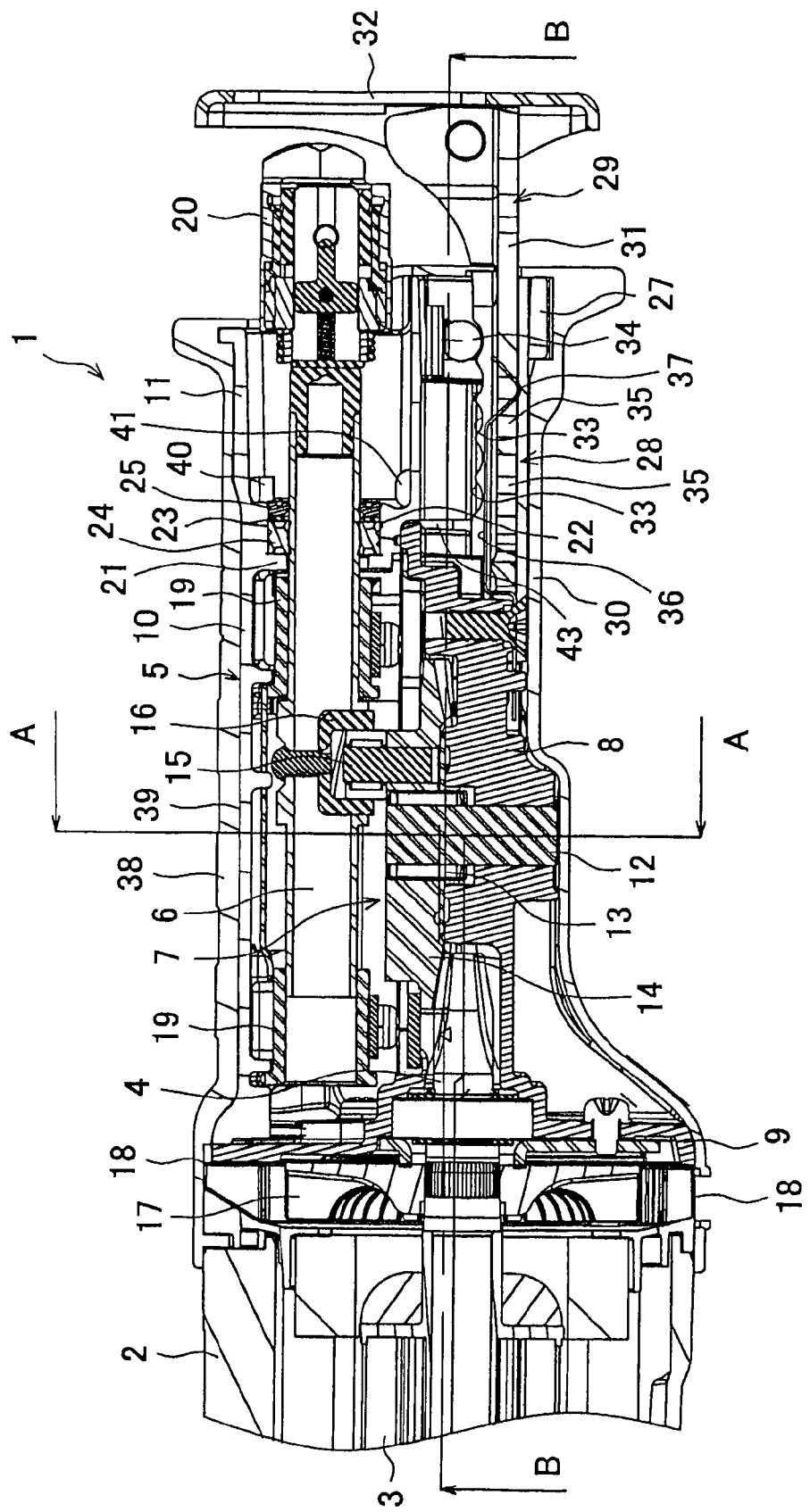
FIG. 2 is a vertical section view of the reciprocating saw.

FIG. 1 is a partial side view of a reciprocating saw, which is an example of a cutting tool according to the present invention, and FIG. 2 is a vertical sectional view of a central part. A reciprocating saw 1 has a motor 3 accommodated in a metal motor housing 2. In front of the motor housing 2 (that is, the right side of FIG. 1), a body housing 5 accommodating a slider 6 and a crank mechanism 7 is connected. The slider 6 is in a shape of tubular rod and is movable back and forth. The crank mechanism 7 converts the rotation of the output shaft 4 of the motor 3 into reciprocating motion of the slider 6. The body housing 5 consists of a lower housing 8 and an upper housing 10, both of which are made of metal. The lower housing 8 has a flange portion 9 integrally provided at its rear, which is threadedly connected to the motor housing 2. The upper housing 10 is mounted on the lower housing 8 and is extendedly provided with a cylindrical portion 11 having an opening to the front at its front end.

Figure 3:
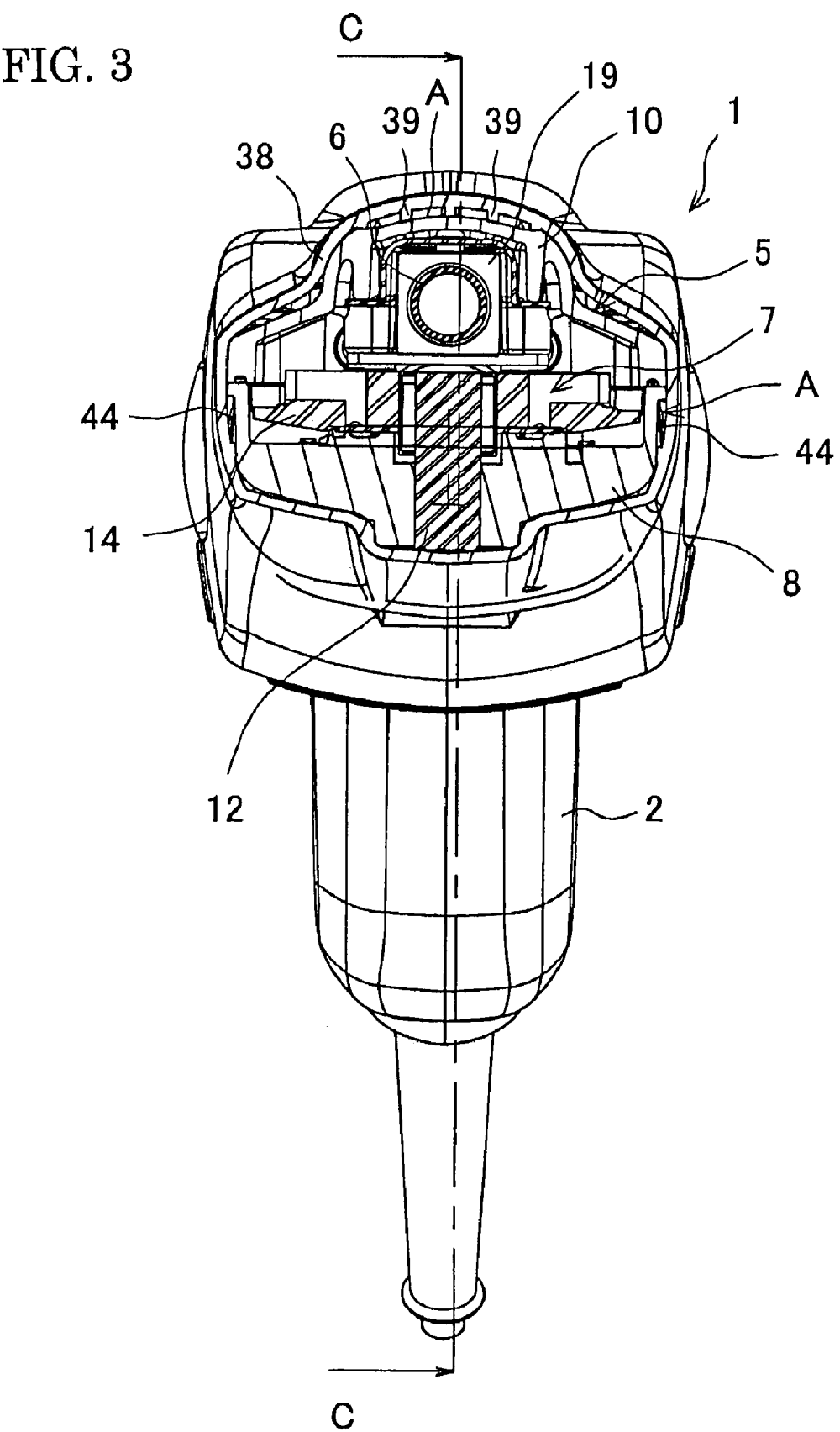
FIG. 3 is a section view taken along line A-A of FIG. 2.
Figure 4:
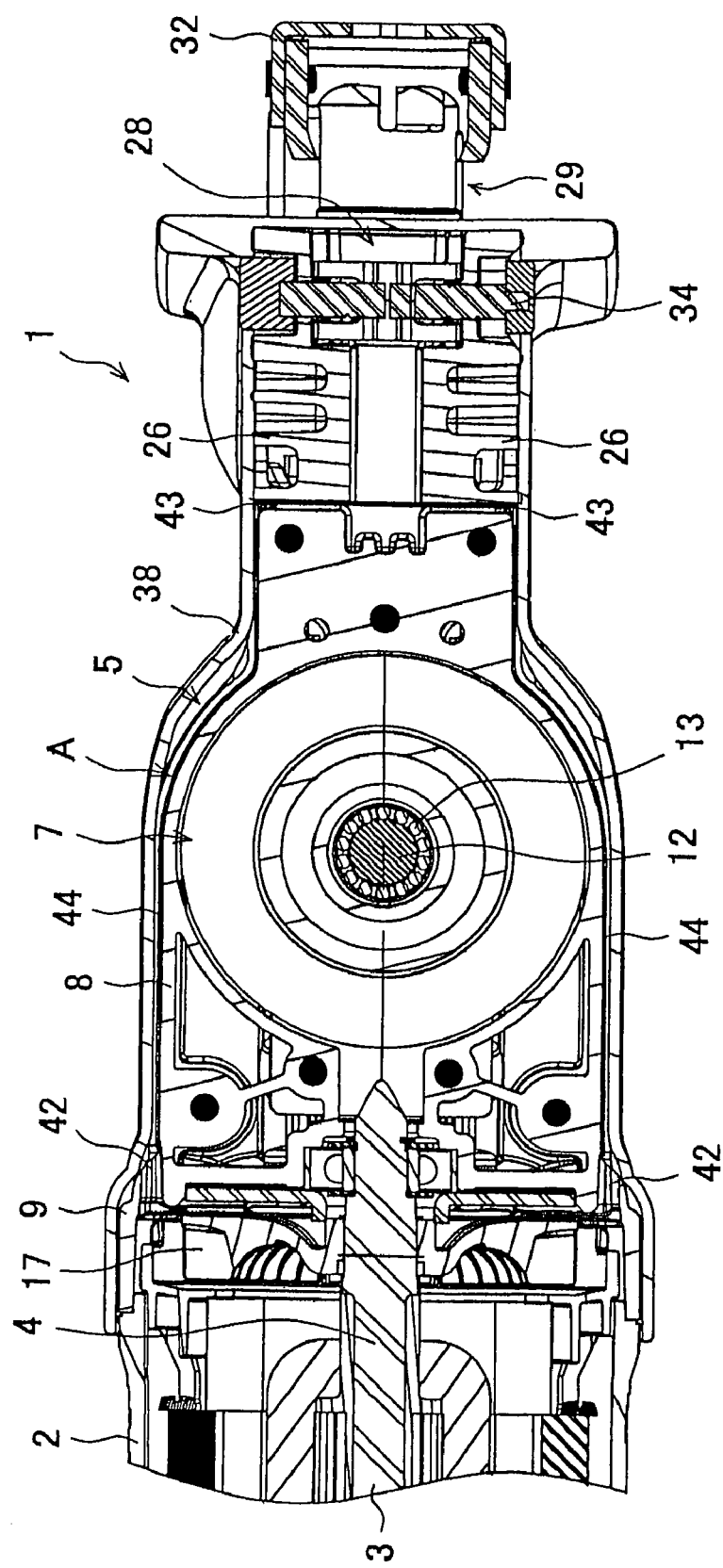
FIG. 4 is a section view taken along line B-B of FIG. 2.

As shown in FIGS. 3 and 4, the crank mechanism 7 consists of a bevel gear 14, an eccentric pin 15 and a slide plate 16 whose sectional view is an open box. The bevel gear 14 is externally provided on a shaft 12 standing toward the top from the bottom of the lower housing 8 through a needle bearing 13. The bevel gear 14 is rotatable and engages with the output shaft 4. The eccentric pin 15 projects at an upper eccentric position of the bevel gear 14. The slide plate 16 axially supports the eccentric pin 15 so as to be rotatable and is fixed orthogonally at the lower side of the slider 6. The reference number 17 denotes a fan for cooling the motor fixed to the output 4 in the flange portion 9 of the lower housing 8. In accordance with rotation of the output shaft 4, the fan 17 cools the motor 3 by vacuuming cooling air from an intake port (not shown) provided at the rear of the motor housing 2 and discharging the same from exhaust ports 18, 18 . . . provided at the upper and lower surfaces of the flange portion 9.

The slider 6 is held by guide sleeves 19, 19 accommodated at the front and rear portions of the upper housing 10 so as to be movable back and forth. Moreover, the slider 6 penetrates through a cylindrical portion 11 of the upper housing 10 to protrude to the front, and a blade (not shown) can be attached to the slider 6 through a blade holder 20 provided at the front end of the slider 6. On the rear side of the cylindrical portion 11 in the upper housing 10, a blocking portion 21 penetrated by the slider 6 is formed. The blocking portion 21 serves as a bottom of a circular opening 22 in which sealing members 24, 25 penetrated by the slider 6 are disposed back and forth of a flat washer 23.

When the output shaft 4 rotates to cause the bevel gear 14 to rotate, the slide plate 16 moves back and forth with a stroke defined by a diameter of a locus of the eccentric pin 15 in accordance with the rotation of the eccentric pin 15. Accordingly, the slider 6 performs reciprocating motion and cutting operation can be performed with a blade connected to the slider 6.

On the other hand, on the lower side of the cylindrical portion 11 of the upper housing 10 (that is, the front side of the lower housing 8) a pair of guide walls 26, 26 are extendedly provided. The guide walls 26, 26 have a stepped structure consisting of an upper thick portion and a lower thin portion. Moreover, the front end portions of the guide walls 26, 26 are connected each other at the bottom to form a second cylindrical portion 27. At a space 28 between the guide walls 26, 26, a guide shoe 29 serving as a guide member is placed. The guide shoe 29 consists of a slide bar 31 and a shoe 32. The slide bar 31 which is open-boxed in a sectional view is placed so as to be slidable back and forth along a guide plate 30 bridging the lower surface of the lower housing 8 and the second cylindrical portion 27. The shoe 32 is fixed orthogonally to the front end of the slide bar 31 and is penetrated by the blade attached to the slider 6.

The slide bar 31 has continuously corrugated engaging portions 33, 33 . . . which are placed symmetrically on the top surfaces of the lateral side walls bent toward the top. A columnar lock pin 34, which is inserted slidably to right and left between the guide walls 26, 26, engages with any of the engaging portions 33, 33 . . . , thereby regulating the sliding motion of the slide bar 31. The lock pin 34 has an undercut (not shown) to pass the lateral side walls of the slide bar 31 at a predetermined position in the axial direction. In a normal state, the lock pin 34 is biased to a position where the undercut and the side walls are misaligned in the right-and-left direction. Accordingly, when the lock pin 34 is slid to a release position where the undercut is aligned with the side walls, the engagement between the lock pin 34 and the engaging portion 33 is released, whereby sliding motion of the slide bar 31 is feasible. In addition, at the center portion of the slide bar 31, holes 35, 35 . . . are aligned in the longitudinal direction in accordance with the engaging portion 33. The hole 35 is able to be resiliently engaged with a V-shaped front end portion 37 of a plate spring 36 fixed to the lower housing 8. Because of this structure, positioning and click operation of the slide bar 31 can be obtained.

Figure 5:
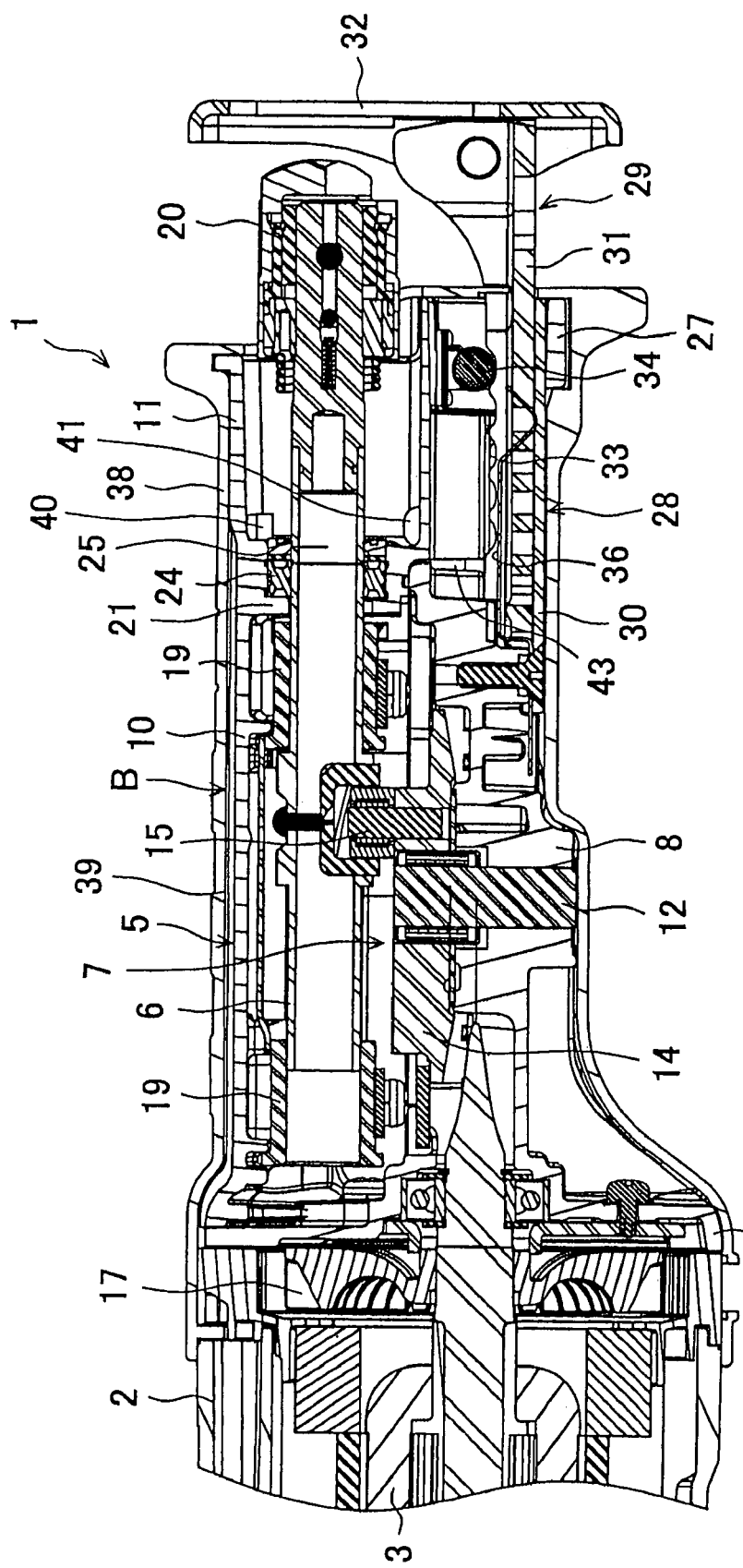
FIG. 5 is a section view taken along line C-C of FIG. 3.
Figure 6:
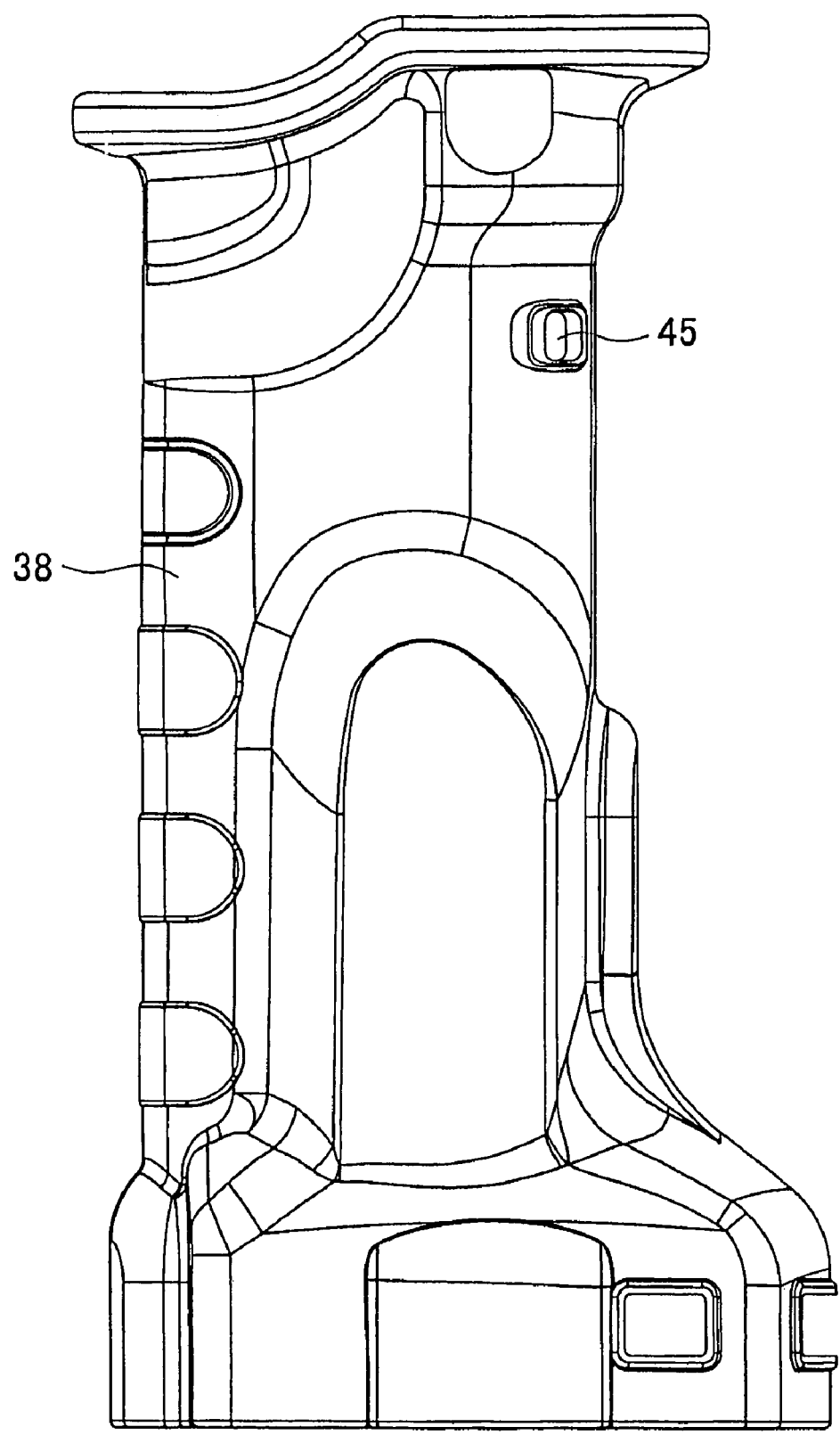
FIG. 6 is a side view of the insulating cover.

The reference number 38 denotes a rubber insulating cover. As shown in FIG. 6, the insulating cover 38 is in a cylindrical shape and placed to the body housing 5 from the front in a manner that substantially covers all surfaces of the body housing 5 including the flange portion 9. As shown in FIGS. 2, 3 and 5, on the upper inner face of the insulating cover 38, a plurality of ribs 39, 39 . . . are provided with a predetermined distance in the longitudinal direction. The ribs 39, 39 . . . extend from the flange portion 9 of the lower housing 8 to the rear of the cylindrical portion 11 of the upper housing 10. On the upper side of the cylindrical portion 11, a pair of guiding ports 40, 40 are provided in front of the sealing member 25. On the other hand, on the lower side of the cylindrical portion 11, a pair of outlets 41, 41 are provided at the end of the extending root of the guide walls 26, 26 as well as at substantially right under the guiding ports 40, 40.

On the other hand, in the vicinity of connecting portion of the lower housing 8 with the upper housing 10 and further in front of the flange portion 9, air outlets 42, 42 which communicate with an accommodating room of the fan 17 of the lower housing 8 are provided. Moreover, between the front end of the lower housing 8 and the rear end of the guide walls 26 of the upper housing 10, second guiding ports 43, 43 are provided. As shown in FIG. 3, between the insulating cover 38 and the lower housing 8, clearances 44, 44 which allow the right-and-left air outlets 42, 42 and second guiding ports 43, 43 to communicate with each other are provided.

With this configuration, when the insulating cover 38 is placed, an air passage A is formed through which cooling air flows. That is, the cooling air discharged from the air outlets 42, 42 moves to the front after passing through the clearances 44, 44 between the insulating cover 38 and the lower housing 8 respectively, and flows into the space 28 as the junction through the second guiding ports 43, 43 to be discharged to the front.

Also with this configuration, when the insulating cover 38 is placed, a second air passage B is formed. In the second air passage B, cooling air discharged from the upper exhaust port 18 moves to the front after passing through the clearance between the upper housing 10 and the insulating cover 38, and flows into the cylindrical portion 11 through the guiding port 40 to be discharged after passing the cylindrical portion 11 or through the outlet 41. It should be noted that the insulating cover 38 has openings 45, 45 (shown in FIG. 6) at its right and left sides which guide cooling air discharged from the outlet 41 to the outside.

In a reciprocating saw 1 configured as described above, when a switch (not shown) is turned ON to drive the motor, the slider performs reciprocating motion as mentioned before. Then in accordance with rotation of the output shaft 4 the fan 17 rotates and discharges cooling air passed through the motor housing 2 from either the exhaust port 18 or the air outlet 42. Here, cooling air from the upper exhaust port 18 passes through the air passage B to flow into the cylindrical portion 11. Among the cooling air, some air is discharged to the front. The rest moves downward in front of the sealing member 25 along the surface of the slider 6. Then it moves toward the outlet 41 of the upper housing 10, and is discharged to the outside through the opening 45 of the insulating cover 38. This flow of the cooling air cools the upper part of the upper housing 10, the cylindrical portion 11 and the guide wall 26 and so on, whereby heat generated from reciprocating motion of the slider 6 can be diffused. Moreover, by means of the cooling air discharged from the cylindrical portion 11 along the slider 6, dust generated from material to be cut can be blown out. Furthermore, the intrusion of the dust into the sealing member 25 can be prevented.

On the other hand, the cooling air discharged from the air outlet 42 passes through the air passage A to move to the front from the right and left sides of the body housing 5. Then the cooling air flows into the space 28 between the guide walls 26, 26 and moves along the slide bar 31 of the guide shoe 29 to be discharged to the front. This flow of the cooling air cools the lower housing 8. Moreover, since dust which might intrude into the space 28 from the second cylindrical portion 27 is blown to the front, adhesion of the dust on the slide bar 31 and the lock pin 34 and so on can be prevented.

As described above, according to the reciprocating saw 1 of the above embodiment, the insulating cover 38 is extended to a rear part of the body housing 5 so as to cover the exhaust port 18, which forms the air passage A. In the air passage A, the cooling air discharged from the exhaust port 18 is guided into an attaching portion of the guide shoe 29 after passing through the clearance between the body housing 5 and the insulating cover 38, and then discharged to the front of the body housing 5. By doing this, in addition to cooling of the body housing 5, adhesion of the dust on the attaching portions of the guide shoe 29, such as the slide bar 31 and the lock pin 34, can be prevented effectively, thereby maintaining an excellent operability concerning adjustment of the guide shoe 29.

In addition, the second air passage B is provided, in which the cooling air is guided into the body housing 5 through the guiding port 40 provided thereon after passing through the clearance between the body housing 5 and the insulating cover 38. Then, the cooling air is discharged to the outside of the body housing 5 after moving along the surface of the slider 6 in front of the sealing member 25. By doing this, intrusion of dust into the body housing 5 from the sealing portion of the slider 6 can also be prevented. In this way, the excellent sealing property in the body housing 5 can be maintained by using the cooling air efficiently.

It should be noted that the structure of the air passage is not limited to the above embodiment. For example, an air passage provided at the lower part of the housing 5 may be adopted, in which cooling air passes through the clearance between the insulating cover 38 and the lower housing 8 toward the attaching portions of the guide shoe 29, or the above air passage and the air passage A may be adopted simultaneously. Moreover, it is not necessary that the air passage A is provided on both lateral sides, that is, an air passage on only one side is acceptable.

In the air passage B provided at the upper side of the housing, after passing along the surface of the slider 6 the cooling air may be guided to the attaching portions of the guide shoe 29 before the discharge to the front, instead of the direct discharge to the outside. In addition, a plurality of air passages B may be provided on both lateral sides, not limited to the upper side of the body housing. Moreover, discharging all cooling air to the front when it flows into the cylindrical portion 11 is also acceptable, omitting a route along the surface of the slider 6. By doing this, a prevention of dust adhesion on the material to be cut can be improved.

Figure 7:
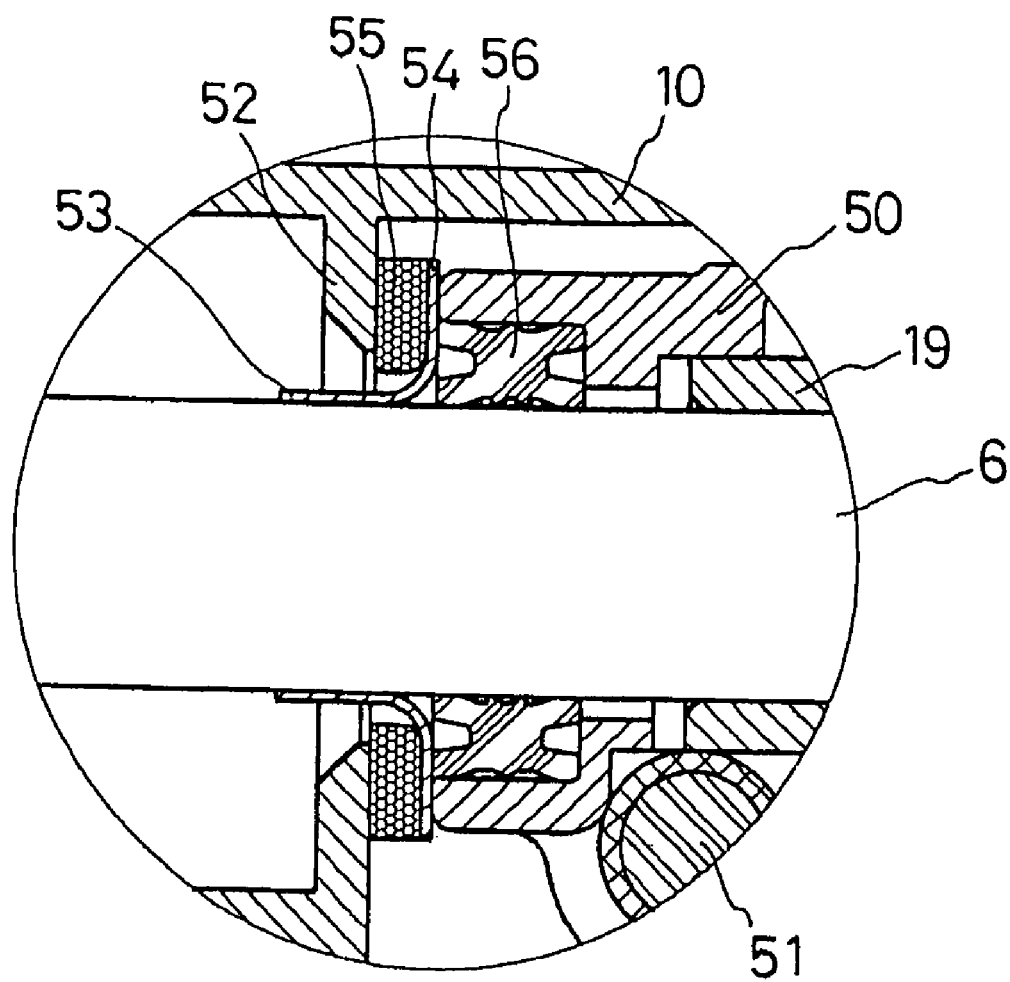
FIG. 7 is an enlarged section view showing a modification of a sealing structure.

As an alternative seal structure of a slider penetrating portion, the structure as shown in FIG. 7 may be adopted. Here, a lower part of the front end portion of a holder 50 which holds the slider 6 movably back and forth (in FIG. 7, the left side is the front), is rotatably supported by a supporting shaft 51 which penetrates transversely in the upper housing 10. The rear end of the holder 50 can oscillate up and down by an oscillating mechanism (not shown) interlocking with the operation of the crank mechanism 7. That is, when the holder 50 performs orbital motion around the supporting shaft 51 in accordance with the motion of the crank mechanism 7, the slider moves gradually forward in the upward direction and retracts gradually in the downward direction in the reciprocating motion.

In a penetrating portion of the slider 6 with respect to a blocking portion 52 of the upper housing 10, a metal sleeve 53 with a flange 54 at its rear end is externally provided so as to oscillate. In front of the flange 54 of the sleeve 53, a ring-shaped sealing member 55 (for example, a sponge) is externally provided contacting to the rear surface of the blocking portion 52. The rear surface of the flange 54 is contacted to both the front end of the holder 50 and a sealing member 56 (here, an X-ring) which is accommodated in the front end of the holder 50 and penetrated by the slider 6.

According to the above seal structure, even when the slider 6 performs reciprocating and orbital motion, an excellent sealing property can be obtained by means of the sleeve 53 and the sealing members 55, 56 located at the front and rear of the flange 54 of the sleeve 53. Therefore, the above air passages adopting this sealing structure can provide an improved dust-proof property of the body housing 5. Needless to say, this sealing structure may be adopted to a reciprocating saw in which the slider does not perform orbital motion as described before.

Although in the above embodiment the body housing consists of an upper and a lower housing, an integrated housing may be ordinarily adopted to the present invention. In addition, a guide member and the attaching structure thereof are not limited to the guide shoe structure as described above, and an axial slide bar or a structure using a thumbscrew may also be adopted.

What is claimed is:

1. A cutting tool comprising:
   a metal housing on which an insulating cover is placed;
   a motor accommodated in a motor housing connected to the rear of the housing;
   at least one exhaust port provided with the housing for discharging cooling air for the motor;
   a slider held by the housing so as to be movable back and forth for performing reciprocating motion by the operation of a reciprocating motion mechanism in accordance with the operation of the motor;
   a blade attached to the front end of the slider for protruding to the front of the housing, and
   a guide member attached to the housing being parallel to the slider and adjustable the length of forward extrusion,
   wherein the insulating cover is extended to a rear part of the housing so as to cover the at least one exhaust port,
   and wherein between the housing and the insulating cover an air passage is provided in which the cooling air discharged from the at least one exhaust port is guided into an attaching portion of the guide member after passing through the clearance between the housing and the insulating cover, and discharged to the front.

2. A cutting tool in accordance with claim 1, having exhaust ports on both lateral sides of the housing, thereby providing air passages on both lateral sides.

3. A cutting tool in accordance with claim 1, wherein the slider penetrates the front part of the housing and the penetrating portion is sealed with a sealing member.

4. A cutting tool in accordance with claim 3, wherein in a penetrating portion of the slider with respect to the housing, a sleeve whose rear end is a flange located in the inner side of the housing is provided, and the sealing member is provided at the front and rear of the flange.

5. A cutting tool in accordance with claim 1, wherein the reciprocating motion mechanism comprises a bevel gear integrated with a shaft which rotates driven by the motor, an eccentric pin provided at an eccentric position of the bevel gear, and a plate which is in an open-boxed shape and provided orthogonally to the slider for slidably holding the eccentric pin.

6. A cutting tool in accordance with claim 1, wherein the guide member comprises a slide bar provided with the housing slidably back and forth and having an open-boxed sectional view as well as continuously corrugated engaging portions on the top surfaces of their lateral side walls, and a shoe fixed orthogonally to the front end of the slide bar, and wherein a lock pin provided with the housing orthogonally to the slide bar is slid to either a position to engage with the engaging portion or a position not to engage with the same, whereby positional adjustment and fixing of the slide bar can be conducted.

7. A cutting tool in accordance with claim 1, wherein the housing consists of a lower housing with a flange portion having an exhaust port and connected to the front of the motor housing, and an upper housing fitted on the upper side of the lower housing.

8. A cutting tool in accordance with claim 1, such that the cooling air, after being exhausted, blows particulate matter generated during operation away from the slider.

9. A cutting tool comprising:
   a metal housing on which an insulating cover is placed;
   a motor accommodated in a motor housing connected to the rear of the housing;
   an exhaust port provided with the housing for discharging cooling air for the motor;
   a slider held by the housing so as to be movable back and forth for performing reciprocating motion by the operation of a reciprocating motion mechanism in accordance with the operation of the motor;
   a blade attached to the front end of the slider for protruding to the front of the housing; and
   a guide member attached to the housing being parallel to the slider and adjustable the length of forward extrusion,
   wherein the insulating cover is extended to a rear part of the housing so as to cover the exhaust port,
   wherein between the housing and the insulating cover an air passage is provided in which the cooling air discharged from the exhaust port is guided into an attaching portion of the guide member after passing through the clearance between the housing and the insulating cover, and discharged to the front,
   wherein the slider penetrates the front part of the housing and the penetrating portion is sealed with a sealing member, and
   wherein a second air passage is provided in which the cooling air discharged from the exhaust port moves along the surface of the slider in front of the sealing member after passing through the clearance between the housing and the insulating cover, and is discharged to the outside of the housing.

10. A cutting tool in accordance with claim 9, wherein at the front end of the housing, a cylindrical portion located in front of the sealing member is provided, and the cooling air passing through the clearance between the housing and the insulating cover is guided into the cylindrical portion through a guiding port provided thereon, and is moved along the surface of the slider.

11. A cutting tool in accordance with claim 10, wherein the cylindrical portion has an outlet to discharge the cooling air which moved along the surface of the slider.

12. A cutting tool in accordance with claim 11, wherein the insulating cover has an opening to guide the cooling air discharged from the outlet to the outside.

* * * * *